(12) United States Patent
Huchthausen

(10) Patent No.: US 11,889,802 B2
(45) Date of Patent: Feb. 6, 2024

(54) TRELLIS STRUCTURE AND CORRESPONDING METHODS

(71) Applicant: Timothy Huchthausen, Hampton, CT (US)

(72) Inventor: Timothy Huchthausen, Hampton, CT (US)

(*) Notice: Subject to any disclaimer, the term of this patent is extended or adjusted under 35 U.S.C. 154(b) by 52 days.

(21) Appl. No.: 17/199,105

(22) Filed: Mar. 11, 2021

(65) Prior Publication Data

US 2021/0282337 A1  Sep. 16, 2021

Related U.S. Application Data

(60) Provisional application No. 62/988,671, filed on Mar. 12, 2020.

(51) Int. Cl.
*A01G 9/12* (2006.01)
*A01G 17/06* (2006.01)

(52) U.S. Cl.
CPC .............. *A01G 9/12* (2013.01); *A01G 17/06* (2013.01)

(58) Field of Classification Search
CPC ..... A01G 9/12; A01G 17/06; A01G 2017/065
See application file for complete search history.

(56) References Cited

U.S. PATENT DOCUMENTS

| | | | | |
|---|---|---|---|---|
| 57,381 A | * | 8/1866 | Roberts et al. | A01G 9/12 47/45 |
| 166,766 A | | 8/1875 | Goodspeed | |
| 601,438 A | * | 3/1898 | Ericksson | A01G 9/12 256/25 |
| 879,959 A | * | 2/1908 | Halliday | A01G 9/12 47/45 |
| 1,146,891 A | * | 7/1915 | Maas | A01G 9/12 47/45 |
| 2,530,015 A | * | 11/1950 | Kouri | A01G 17/06 47/46 |

(Continued)

FOREIGN PATENT DOCUMENTS

| | | | | |
|---|---|---|---|---|
| CN | 104488653 A | * | 4/2015 | ............ A01G 17/06 |
| CN | 105557448 A | * | 5/2016 | |

(Continued)

OTHER PUBLICATIONS

"22 DIY Garden Trellis Projects . . . ", Country Living, Feb. 10, 2021, 19 pages https://www.countryliving.com/gardening/garden-ideas/g31025071/trellis-ideas/?slide=13.

(Continued)

*Primary Examiner* — Son T Nguyen
(74) *Attorney, Agent, or Firm* — UConn IP Law Clinic; Rachel Thomas; Nolyn Allen

(57) ABSTRACT

An apparatus comprising: a first, a second, a third, and a fourth support post, each configured to be positioned vertically, and corresponding to the four vertices of a rectangle when viewed from above, first and a second trellis component configured to be positioned horizontally at an upper position, and a third trellis component configured to be positioned horizontally at a lower position. The apparatus also includes a plant support comprising a string-type component configured to be connected to the third trellis component and the first and second trellis components, giving the plant support a "V" shaped appearance is disclosed herein. Corresponding systems and methods also are disclosed.

9 Claims, 7 Drawing Sheets

(56) References Cited

U.S. PATENT DOCUMENTS

| | | | |
|---|---|---|---|
| 3,793,771 A * | 2/1974 | Slaughter | A01G 9/12 47/31 |
| 4,738,051 A | 4/1988 | Dyson | |
| 4,785,576 A * | 11/1988 | Morgan | A01G 17/06 47/29.1 |
| 5,063,709 A | 11/1991 | Whittaker | |
| 5,357,710 A * | 10/1994 | Dulik | A01G 25/02 47/48.5 |
| 6,393,764 B1 * | 5/2002 | Smith | A01G 9/02 47/65.5 |
| 7,219,467 B1 | 5/2007 | Branman | |
| 2003/0101642 A1 | 6/2003 | Parrish | |
| 2005/0252076 A1 | 11/2005 | Schloesser | |
| 2009/0277083 A1 * | 11/2009 | Barnes | A01G 13/0231 47/46 |
| 2015/0101248 A1 * | 4/2015 | Adkinson | A01G 9/12 47/65.5 |
| 2018/0310492 A1 | 11/2018 | Meiser | |
| 2019/0037779 A1 * | 2/2019 | Chirco | A01G 9/02 |
| 2020/0029507 A1 * | 1/2020 | Carlson | A01G 13/0206 |
| 2020/0120879 A1 * | 4/2020 | Nicholas | A01G 9/12 |
| 2020/0329644 A1 * | 10/2020 | Wardlaw | A01G 9/12 |

FOREIGN PATENT DOCUMENTS

| | | | | |
|---|---|---|---|---|
| CN | 108812015 A | * | 11/2018 | A01G 17/005 |
| DE | 4121597 C2 | * | 10/1997 | A01G 9/12 |
| DE | 102018005775 A1 | * | 1/2020 | A01G 13/0206 |
| KR | 20120052109 A | * | 5/2012 | A01G 17/06 |
| KR | 20160074151 A | * | 6/2016 | |
| KR | 102062495 B1 | * | 1/2020 | |
| WO | WO-2005043982 A1 | * | 5/2005 | A01G 9/12 |
| WO | WO-2019172801 A1 | * | 9/2019 | |
| WO | WO-2021021916 A1 | * | 2/2021 | A01G 13/0206 |

OTHER PUBLICATIONS

"Training and Pruning Methods of Cucurbits" printed May 26, 2020, 3 pages; https://www.slideshare.com/AradhanaSen/training-and-pruning-methods-of-cucurbits.

"Making Garden Plant Supports and Trellisses . . . ", printed May 26, 2020, 4 pages; https://www.do-it-yourself-help.com/garden-plant-trellises.html.

The Best Vegetables for a Trellis . . . , printed May 26, 2020, 14 pages; https://savvygardening.com/vegetables-for-a-trellis/.

* cited by examiner

TRELLIS STRUCTURE AND CORRESPONDING METHODS

CROSS REFERENCE TO RELATED APPLICATIONS

This application claims the benefit of U.S. Provisional Patent Application No. 62/988,671 filed Mar. 12, 2020, the contents of which are incorporated herein by reference in their entirety.

BACKGROUND

Trellis structures are generally known to support and display plants. Trellis structures have features including an open framework of interwoven pieces normally made of wood or metal, in this manner plants can be supported or woven through.

It is problematic when the growing space becomes crowded by the plants because of the lack of space inherent in most trellis structures. When a trellis structure becomes crowded it becomes difficult to groom and harvest the product.

It would be useful to develop and improve upon trellis structures that create a more efficient use of growing space and one that provides more versatility for plant growing space.

SUMMARY

One embodiment described herein is an apparatus comprising a first, a second, a third, and a fourth support post, each configured to be positioned vertically, and corresponding to the four vertices of a rectangle when viewed from above. In addition, a first and a second trellis component are configured to be positioned horizontally at an upper position, a third trellis component is configured to be positioned horizontally at a lower position, and a plant support comprising a string-type component is configured to be connected to the third trellis component and the first and second trellis components, giving the plant support a "V" shaped appearance. The apparatus can be part of a system placed on the ground or another surface. The system can also include one or more live plants in direct contact with the plant support.

In some embodiments, the plant support comprises a string type-component containing less string on one side than on the other side. In some cases, approximately equal quantities of string-type component are employed on one side than the other side. In embodiments, the string-type component comprises at least one of a string, a filament, a cord, a cable, a wire, plastic, and netting.

Another embodiment is a method of making a plant support structure comprising obtaining a first, a second, a third, and a fourth support post, each configured to be positioned vertically, obtaining a first and a second trellis component configured to be positioned horizontally at an upper position, and a third trellis component configured to be positioned horizontally at a lower position. The method also includes obtaining first and second cross members configured to be positioned horizontally at an upper position, and third and fourth cross members configured to be positioned horizontally at a lower position. The method further comprises fastening the first cross member and the third cross member to the first and second support post to form a rigid frame, fastening the second cross member and the fourth cross member to the third and fourth support post to form a rigid frame. The first trellis component is fastened to the first and fourth support posts, the second trellis component is fastened to the second and third support posts, and the third trellis component is fastened to the third and fourth cross members. The method also includes positioning a string-type component on the first, second, and third trellis components forming a "V" shaped plant support.

In embodiments, the plant support is formed by affixing a one-piece, flexible first continuous string-type component having a first end and an opposite longitudinally spaced second end, and comprising at least one of a string, a filament, and a cord, to the first trellis component and the third trellis component by alternately guiding the first continuous string-type component around adjacent pairs or triplets of plant support positioners on the first trellis component and adjacent pairs or triplets of plant support positioners on the third trellis component and pulling the first continuous string-type component with a single pull to be taut, and affixing a one-piece, flexible second continuous string-type component having a first end and an opposite longitudinally spaced second end, and comprising at least one of a string, a filament, and a cord, to the second trellis component and the third trellis component by alternately guiding the second continuous string-type component around adjacent pairs or triplets of plant support positioners on the second trellis component and adjacent pairs or triplets of plant support positioners on the third trellis component and pulling the second continuous string-type component with a single pull to be taut, the first continuous string-type component and the second continuous string-type component forming a "V" shaped plant support with the third trellis component acting as a base of the "V," the third trellis component being a singular, linear, bar-shaped component and the only trellis component positioned below the first and second trellis components that is in direct contact with the first continuous string-type component and the second continuous string-type component.

A further embodiment is an apparatus comprising a first, a second, a third, and a fourth support posts, each configured to be positioned vertically, and corresponding to four vertices of a rectangle when viewed from above, an upper first cross-member connecting the first support post to the second support post, and an upper second cross-member connecting the third support post to the fourth support post such that the first and second cross-members each correspond to form sides of the rectangle, a lower third cross-member connecting the first support post to the second support post, and a lower fourth cross-member connecting the third support post to the fourth support post. The apparatus also includes a first trellis component and a second trellis component positioned horizontally at an upper position, each of the first and second trellis components having a first end portion and a second end portion, the first end portion and the second end portion of the first trellis component being connected to the first and fourth support posts, respectively, and the first end portion and the second end portion of the second trellis component being connected to the second and third support posts, respectively such that the first and second trellis components each correspond to form sides of the rectangle. The apparatus further comprises an intermediate fifth cross-member horizontally connecting the first support post to the second support post, and an intermediate sixth cross-member horizontally connecting the third support post to the fourth support post, a third trellis component positioned horizontally at a lower position and connected to a central point on the lower third cross-member and a central point on the lower fourth cross-member, a first rigid reinforcing member extending vertically and attached to the third cross-member and the intermediate fifth cross-member, and a second rigid reinforcing member extending vertically and attached to the fourth cross-member and the intermediate sixth cross-member. In addition, the apparatus includes a plurality of plant support positioners longitudinally spaced along each of the first trellis component, the second trellis component and the third trellis component and being mounted in a stationary configuration, and a plant support comprising a flexible first continuous string-type component connected to the third trellis component and the first trellis component, and a flexible second continuous string-type component connected to the third trellis component and the second trellis component, the first continuous string-type component being alternately guided around adjacent pairs of plant support positioners on the first trellis component and adjacent pairs of plant support positioners on the third trellis component, the second continuous string-type component being alternately guided around adjacent pairs of plant support positioners on the second trellis component and adjacent pairs of plant support positioners on the third trellis component, the first continuous string-type component and the second continuous string-type component giving the plant support a "V" shaped appearance with the third trellis component acting as a base of the "V," wherein the third trellis component is a singular, linear, bar-shaped component, and is the only trellis component positioned below the first and second trellis components that is in direct contact with the plant support.

Yet another embodiment is a trellis structure in which a first support post, a second support post, a third support post, and a fourth support post are partially embedded underground. In this embodiment, intermediate cross-members may not be needed for reinforcement due to the stabilizing effect of the ground.

DETAILED DESCRIPTION

The trellis structure described herein is an apparatus that supports rows of plants in a garden. The system includes a framework that is comprised of four vertical support posts. The vertical support posts are stabilized with two or three horizontal cross-members placed on either side in the direction of breadth. The vertical support posts also are held in place with two upper horizontal plant trellis components attached on each side horizontally. A third horizontal trellis component is attached to both of the lower horizontal cross-members. When viewed from the side, the arrangement of the three trellis structures form a "V" shape. The two upper horizontal trellis components are connected to the lower horizontal trellis component with the use of a string-type structure that may be string, wire, netting, or a combination thereof. In the embodiment shown in the figures, there are two vertically disposed metal pipes with a lower end that can rest on the ground or be positioned underground. These pipes are attached to the horizontal cross-members with pipe straps which act as stabilizers in windy conditions. In the illustrated embodiment, the intermediate cross-members and the lower cross-members are connected to the metal pipes, using pipe clamps or another suitable means of connection.

The advantages of this type of trellis system include the efficient use of growing space which allows for two rows of plants at the base of the "V" formed by the strings for the growing instead of just one row, and the ease of grooming and harvesting the produce, which hangs toward the picker. The strings provide shape to the structure. The system also provides for improved air circulation, as well as the possibility of the structure holding protective shade cloth, insect screening, and/or wire to exclude rodents or prevent deer from eating newly planted seedlings.

Figure 1:
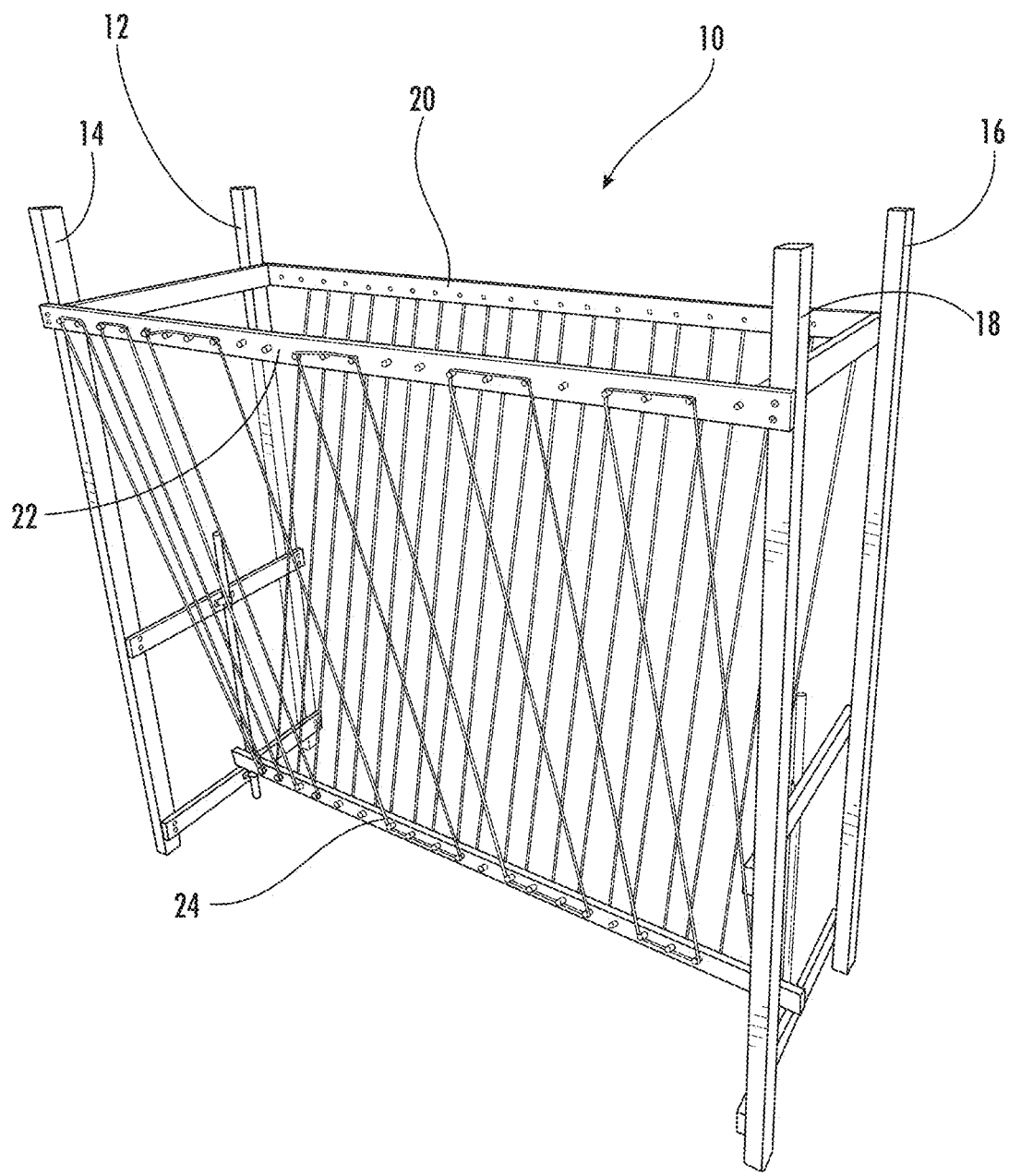
FIG. 1 shows a front perspective view of the first embodiment.

Referring to the drawings, FIG. 1 shows a front perspective view of the trellis structure 10, including a first support post 12, a second support post 14, a third support post 18, and a fourth support post 16. A first trellis component 20 and a second trellis component 22 are positioned horizontally at an upper location, and a third trellis component 24 is positioned horizontally at a lower location. The first trellis component 20 connects first support post 12 to fourth support post 16. The second trellis component 22 connects second support post 14 to third support post 18.

Figure 2:
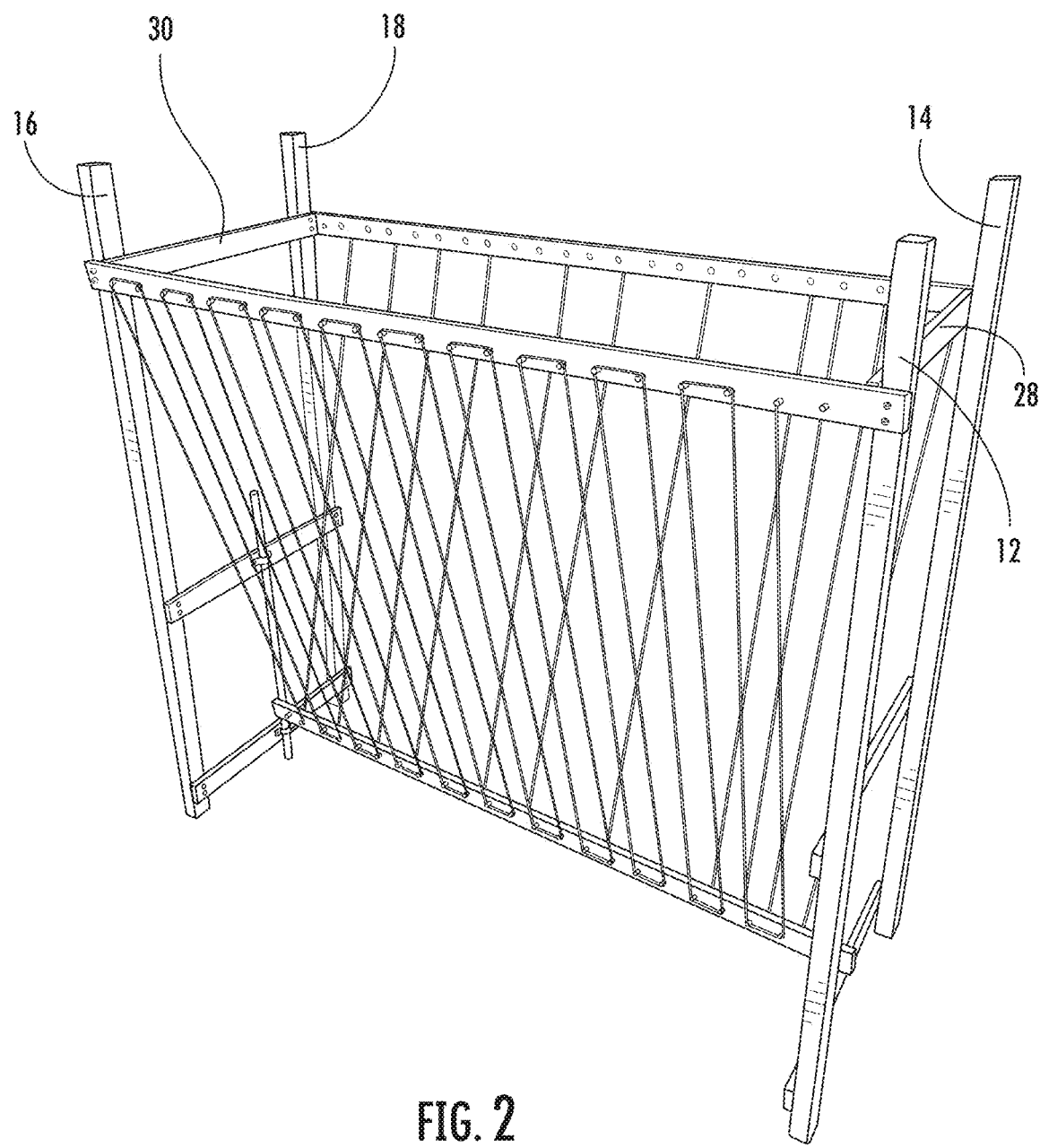
FIG. 2 illustrates a rear perspective view of the first embodiment.

FIG. 2 illustrates a rear perspective view of the trellis. This view shows an upper first cross-member 28 configured to connect the first support post 12 to the second support post 14 proximate the first trellis component 20, and an upper second cross-member 30 configured to connect the third support post 18 to the fourth support post 16 proximate the first trellis component 20 such that the first cross member 28 and second cross-member 30 each correspond to form sides of a rectangle when the trellis structure 10 is viewed from the top or the end. In some cases, first cross member 28 and second cross-member 30 are located at the same height as first trellis component 20 and second trellis component 22. A third trellis component 24 is configured to be horizontally positioned at a height between about 5 and about 20 inches, or about 7 and about 16 inches, or about 8 and about 12 inches above a ground surface.

Figure 3:
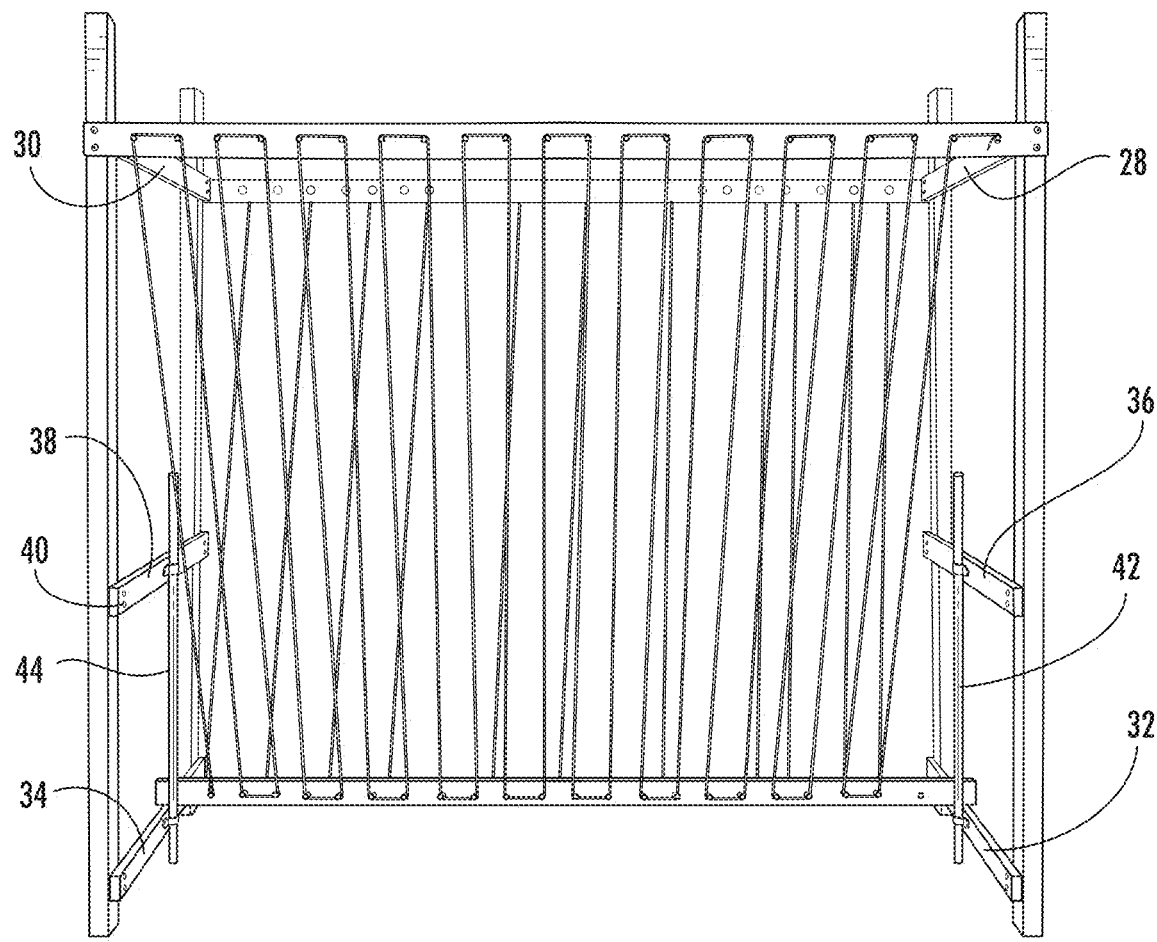
FIG. 3 illustrates a rear side view of the first embodiment.
Figure 4:
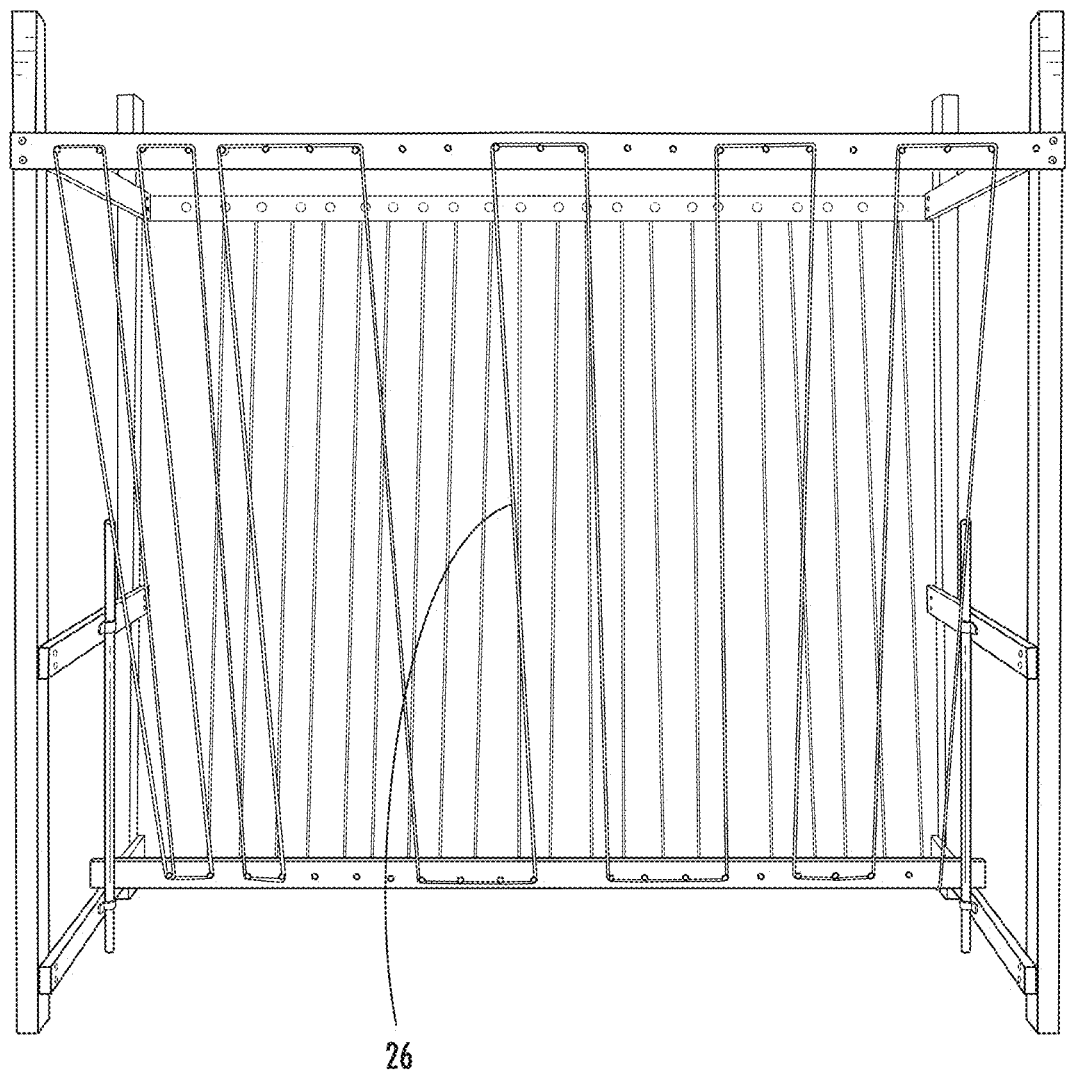
FIG. 4 illustrates a front side view of the first embodiment.
Figure 5:
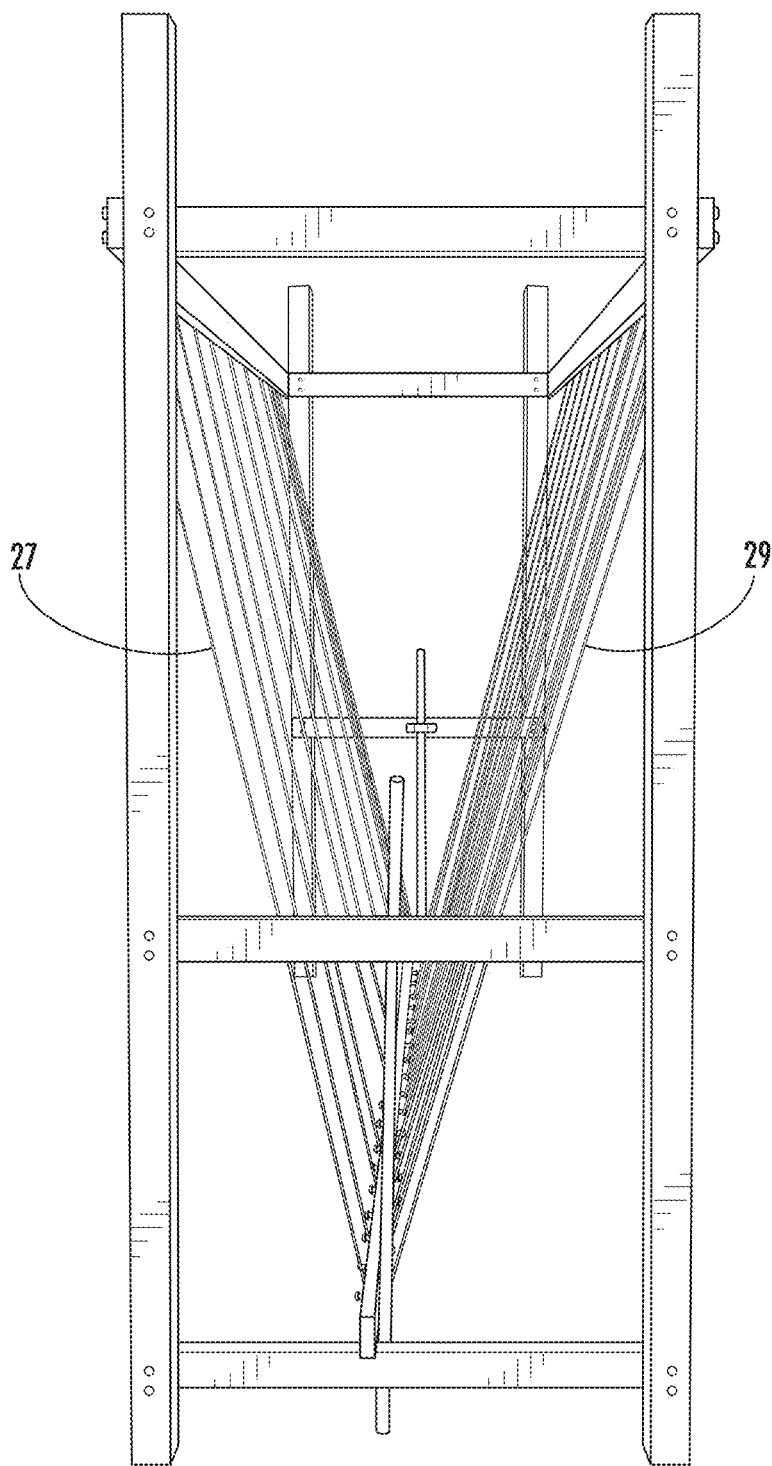
FIG. 5 illustrates an end view of the first embodiment.

As shown in FIG. 3 and FIG. 4, trellis structure 10 comprises a lower third cross-member 32 supporting the first end portion of the lower third trellis component 24 and a lower fourth cross-member 34 supporting the second end portion of the lower third trellis component 24. The lower third trellis component 24 is an elongated, one-piece, singular, linear, bar-shaped component. As is shown in FIGS. 3-5, the lower third trellis component 24 is the only trellis component positioned below the first trellis component 20 and second trellis component 22 that is in direct contact with the plant support 26. Lower third cross member 32 connects the first support post 12 to the second support post 14. Lower fourth cross member 34 connects the third support post 18 to the fourth support post 16. FIGS. 3 and 4 also show an intermediate fifth cross-member 36 configured to horizontally connect the first support post 12 to the second support post 14, and an intermediate sixth cross-member 38 configured to horizontally connect the third support post 18 to the fourth support post 16. The fifth cross-member 36 and sixth cross-member 38 provide reinforcement to the trellis structure. The cross-members are fastened to the vertical support posts using fasteners 40 which may be configured by at least one of screws, nails, nuts, bolts, slots, and pegs.

In reference to FIG. 4, a plant support 26 comprising a string-type component is connected to the third trellis component 24 and the first 20 and second 22 trellis components, giving the plant support 26 a "V" shaped appearance. The plant support 26 may contain less string on one side than on the other side, or may have approximately equivalent quantities of string on both sides. The string-type component comprises at least one of a string, a filament, a cord, a cable, a wire, plastic, and netting. A single, continuous string may be used, or multiple separate pieces of string may be used. The plant support 26 includes a first side 27 and a second side 29. When viewed from the end, the angle between first side 27 and a second side 29 is in the range of about 10 degrees to about 50 degrees, or about 15 degrees to about 45 degrees, or about 20 degrees to about 40 degrees.

Figure 6:
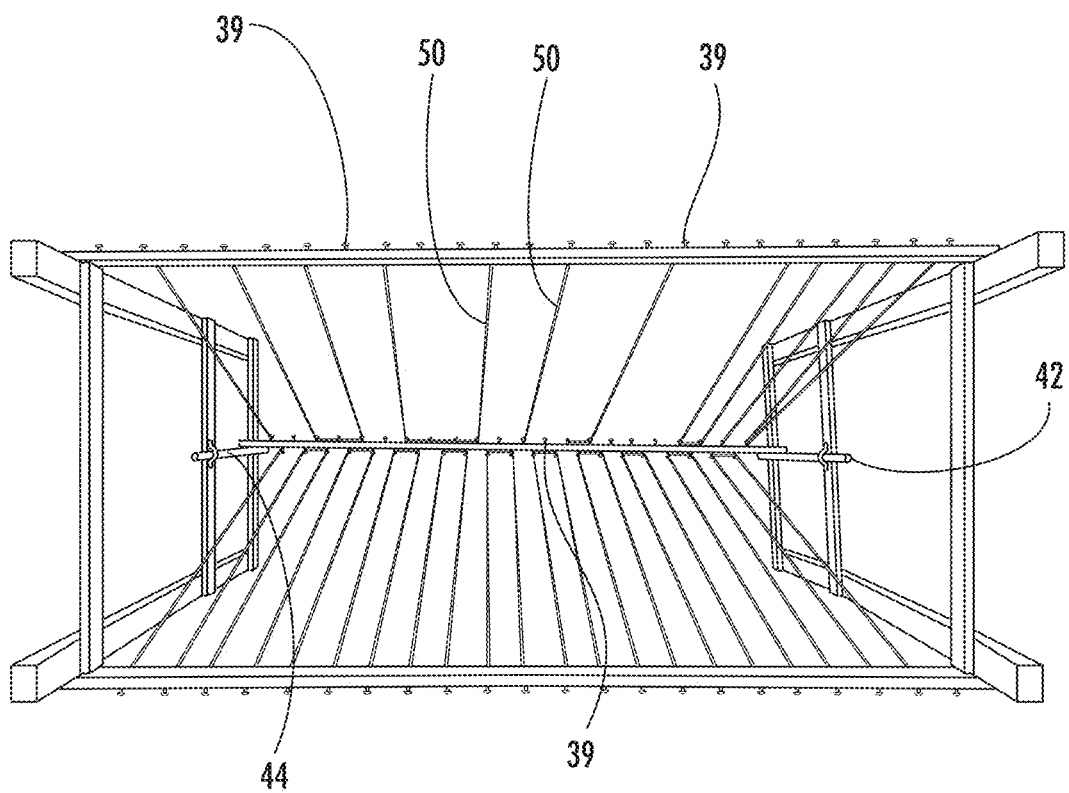
FIG. 6 illustrates a top plan view of the first embodiment.

FIGS. 3-6 illustrate an optional first rigid reinforcing member 42 vertically attached to the third cross member 32 and fifth cross-member 36, and a second rigid reinforcing member 44 vertically attached to the fourth cross member 34 and the sixth cross member 38. FIG. 6 also includes a view of the plurality of string positioners 39 which position the strings on the trellis components. The string can be guided around or wound around the string positioners, or can be removably attached to the string positioners in another way. The spacing of the string segments 50 can be adjusted in accordance with the size of the leaves of the crop that is being grown. For example, the squash plant has larger leaves than other crops so the strings can be distanced farther apart from one another, bypassing some of the string positioners 39, as is illustrated on the front side of the trellis structure 10 in FIG. 6. Connecting the strings to the string positioners 39 at greater separation distances provides space for the leaves to grow between adjacent string segments. When the plant leaves are shorter the strings can be connected to most, or all, of the string positioners 39. In some cases, the string positions are adjusted as the plants grow in order to accommodate leaf size, plant height, etc. The string positioners can be nails, screws, pegs, staples or other suitable components around which a string can be guided or wound, and/or to which a string can be tied.

Figure 7:
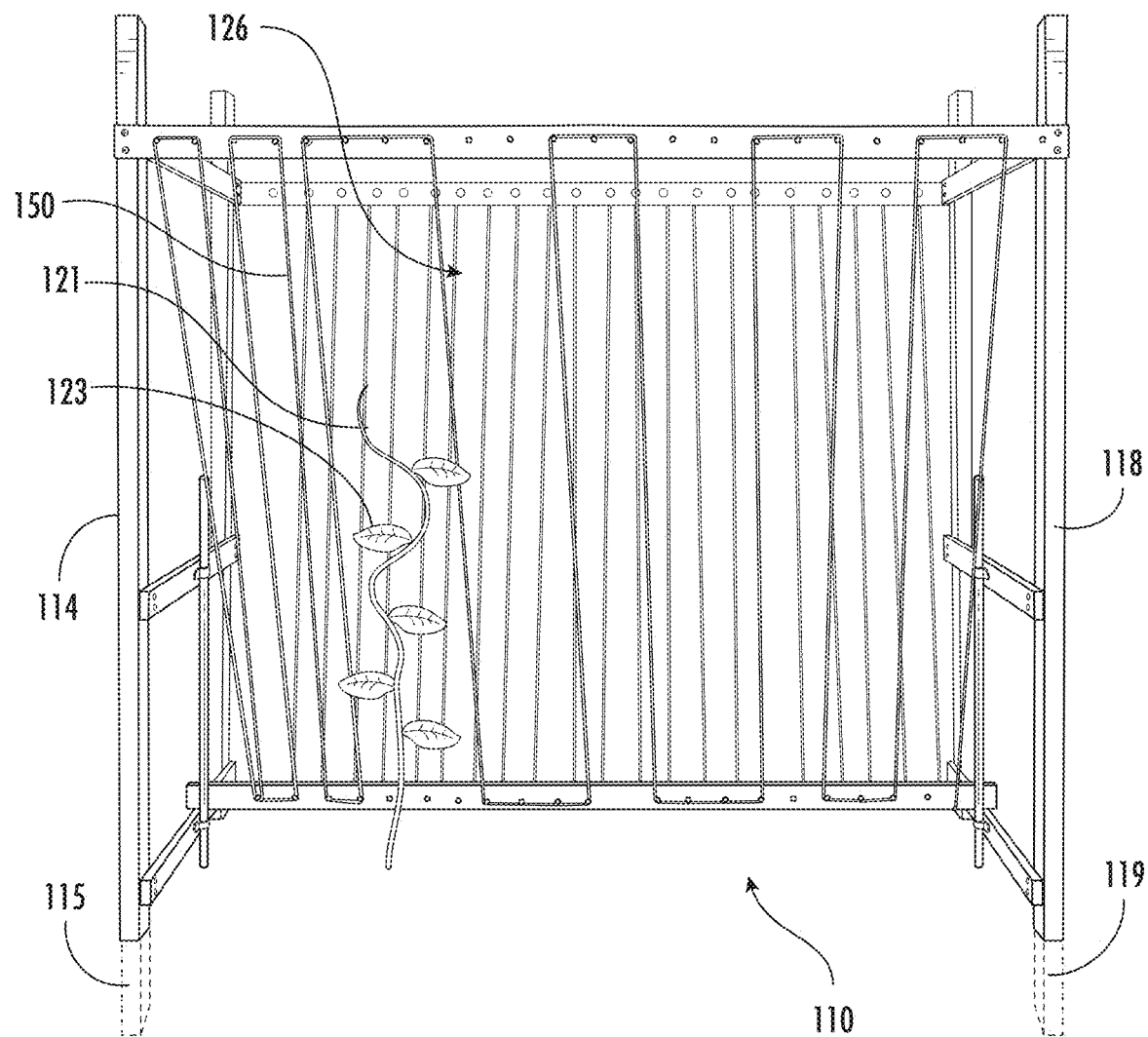
FIG. 7 shows a front side view of the second embodiment.

FIG. 7 illustrates a second embodiment 110 in which the trellis structure includes a first support post 112, a second support post 114, a third support post 118, and a fourth support post 116, all of which have a lower end portion positioned underground. The lower end portion 115 of second support post 114 and the lower end portion 119 of the third support post 118 are schematically shown in FIG. 7. In this embodiment, the intermediate cross members and vertical poles (corresponding to components 36, 38, 42 and 44 in the first embodiment) easily can be eliminated because the embodiment is reinforced by positioning the lower ends of the vertical posts underground. A plant 121 with a plurality of leaves 123 is schematically shown growing along the plant support 126 and intertwining with the string segments 150.

In embodiments, the support posts, trellis components and cross-members are formed from wood, metal, a thermoplastic material, a thermoset material, a composite, or another weather-resistant material. In embodiments the plant support 26 comprises polyester, tomato twine, twine of other material such as cotton, hemp, or plastic, and other string like materials.

A number of alternatives, modifications, variations, or improvements therein may be subsequently made by those skilled in the art, which are also intended to be encompassed by the following claims.

What is claimed is:

1. A method of making a plant support structure comprising: obtaining a first, a second, a third, and a fourth support posts, each configured to be positioned vertically, obtaining a first trellis component and a second trellis component configured to be positioned horizontally at an upper position, and a third trellis component configured to be positioned horizontally at a lower position, each of the first trellis component, the second trellis component, and the third trellis component having a first terminal end, an opposite second terminal end, and a length, mounting a plurality of stationary plant support positioners along substantially the entire length of each of the first trellis component, the second trellis component, and the third trellis component in a spaced arrangement, obtaining first and second cross-members configured to be positioned horizontally at an upper position, and third and fourth cross members configured to be positioned horizontally at a lower position, obtaining an intermediate fifth cross-member configured to horizontally connect the first support post to the second support post, and an intermediate sixth cross-member configured to horizontally connect the third support post to the fourth support post, obtaining a first rigid reinforcing member configured to be attached to the third cross-member and the intermediate fifth cross-member, and a second rigid reinforcing member configured to be attached to the fourth cross-member and the intermediate sixth cross-member, fastening the first cross-member, the third cross-member and the intermediate fifth cross member to the first and second support posts to form a rigid frame, fastening the second cross-member, the fourth cross-member and the intermediate sixth cross-member to the third and fourth support posts to form a rigid frame, fastening the first trellis component to the first and fourth support posts, fastening the second trellis component to the second and third support posts, fastening the third trellis component to the third and fourth cross-members, fastening the first rigid reinforcing member to the third cross-member and the intermediate fifth cross-member such that the first rigid reinforcing member is parallel to the first support post and the second support post, and extends vertically, fastening the second rigid reinforcing member to the fourth cross-member and the intermediate sixth cross-member such that the first rigid reinforcing member is parallel to the third support post and the fourth support post, and extends vertically, and forming a plant support by affixing a one-piece, flexible first continuous string-type component having a first end and an opposite longitudinally spaced second end, and comprising at least one of a string, a filament, and a cord, to the first trellis component and the third trellis component by alternately guiding the first continuous string-type component around adjacent pairs or triplets of plant support positioners on the first trellis component and adjacent pairs or triplets of plant support positioners on the third trellis component and pulling the first continuous string-type component to be taut, and affixing a one-piece, flexible second continuous string-type component having a first end and an opposite longitudinally spaced second end, and comprising at least one of a string, a filament, and a cord, to the second trellis component and the third trellis component by alternately guiding the second continuous string-type component around adjacent pairs or triplets of plant support positioners on the second trellis component and adjacent pairs or triplets of plant support positioners on the third trellis component and pulling the second continuous string-type component to be taut, the first continuous string-type component and the second continuous string-type component forming a "V" shaped plant support with the third trellis component acting as a base of the "V," the third trellis component being a singular, linear, bar-shaped component and the only trellis component positioned below the first and second trellis components that is in direct contact with the first continuous string-type component and the second continuous string-type component.

2. The method of claim 1, wherein the first continuous string-type component and the second continuous string-type component support at least one of a shading component and a screen component.

3. The method of claim 1, wherein the first trellis component is fastened to the first and fourth support posts, and the second trellis component is fastened to the second and third support posts, using at least one of screws, nails, nuts and bolts, slots and pegs.

4. The method of claim 1, wherein the third trellis component is configured to be horizontally positioned at a height between eight and fifteen inches above a ground surface.

5. The method of claim 1, where the third trellis component is fastened to the third and fourth cross-members using at least one of screws, nails, nuts and bolts, slots, and pegs.

6. The method of claim 1, where the first, second, third and fourth support posts are configured to be positioned on a surface.

7. The method of claim 1, where the first, second, third and fourth support posts each include a first end portion configured to be mounted stably in the ground.

8. The method of claim 1, wherein the support posts, trellis components and cross-members each comprise at least one of a wood, a metal, a thermoplastic material, and a thermoset material.

9. The method of claim 1, wherein the plant support positioners comprise at least one of nails and screws.

\* \* \* \* \*